(12) United States Patent
Oike

(10) Patent No.: US 12,378,810 B2
(45) Date of Patent: Aug. 5, 2025

(54) SYSTEM AND METHOD FOR OPENING BOARDING DOOR

(71) Applicant: TOYOTA JIDOSHA KABUSHIKI KAISHA, Toyota (JP)

(72) Inventor: Rika Oike, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 17/827,086

(22) Filed: May 27, 2022

(65) Prior Publication Data

US 2023/0010902 A1 Jan. 12, 2023

(30) Foreign Application Priority Data

Jul. 12, 2021 (JP) .................................. 2021-114998

(51) Int. Cl.
*E05F 15/73* (2015.01)
*B60J 5/10* (2006.01)
*B60R 25/01* (2013.01)

(52) U.S. Cl.
CPC .............. *E05F 15/73* (2015.01); *B60J 5/101* (2013.01); *B60R 25/01* (2013.01); *E05F 2015/767* (2015.01); *E05Y 2400/8505* (2024.05); *E05Y 2400/8515* (2024.05); *E05Y 2900/531* (2013.01); *E05Y 2900/548* (2013.01)

(58) Field of Classification Search
CPC .............. E05F 15/73; E05F 2015/767; E05F 2015/763; E05F 2015/765; E05F 15/40; E05Y 2900/531; E05Y 2900/548; E05Y 2900/546; E05Y 2900/50; E05Y 2900/506; B60R 7/04; B60J 5/10; B60J 5/06;

(Continued)

(56) References Cited

U.S. PATENT DOCUMENTS

2016/0251890 A1* 9/2016 Sakai ....................... E05F 15/77
340/5.72
2016/0319585 A1* 11/2016 Goto ....................... E05B 83/20
(Continued)

FOREIGN PATENT DOCUMENTS

CN 103318130 A 9/2013
CN 108116366 A 6/2018
(Continued)

OTHER PUBLICATIONS

Partial translation of JP 2006-97312 A, translated by Steven M. Spar of the Translation Service Center of the United States Patent and Trademark Office, Jun. 25, 2024 (Year: 2024).*

*Primary Examiner* — Khoi H Tran
*Assistant Examiner* — Tanner L Cullen
(74) *Attorney, Agent, or Firm* — Oliff PLC

(57) ABSTRACT

The present disclosure provides a method of opening a boarding door of a vehicle that provides use of a trunk room to a passenger reserving the trunk room. The method comprises keeping the boarding door closed until both a first condition and a second condition are satisfied and opening the boarding door or enabling the boarding door to be opened in response to both the first condition and the second condition being satisfied. Here, the first condition is that the passenger is in the vicinity of the boarding door. The second condition is that the trunk door is closed or that a reservation of the trunk room is cancelled.

7 Claims, 4 Drawing Sheets

Step1: Vehicle and passenger arrive at boarding point.

Step2: Passenger opens trunk door and loads baggage into trunk room.

Step3: Boarding door opens, and passenger gets in passenger room.

(58) Field of Classification Search
CPC ....... B60J 5/101; B60J 5/105; G01C 21/3629; G01C 21/3438; G08G 1/202
See application file for complete search history.

(56) References Cited

U.S. PATENT DOCUMENTS

| | | | | |
|---|---|---|---|---|
| 2017/0044816 | A1* | 2/2017 | Salter | B60J 5/101 |
| 2018/0151009 | A1 | 5/2018 | Kim et al. | |
| 2019/0128694 | A1* | 5/2019 | Matsushita | G01C 21/3602 |
| 2019/0299847 | A1* | 10/2019 | Mori | B60Q 1/247 |
| 2021/0237687 | A1* | 8/2021 | Tsuchiya | H04W 4/48 |

FOREIGN PATENT DOCUMENTS

| | | | | |
|---|---|---|---|---|
| CN | 109709946 A | | 5/2019 | |
| DE | 102005021145 A1 | * | 11/2006 | B60J 5/101 |
| JP | 2006097312 A | * | 4/2006 | B60J 5/06 |
| JP | 2012172367 A | * | 9/2012 | E05B 49/00 |
| JP | 2019-020985 A | | 2/2019 | |
| JP | 2019175034 A | * | 10/2019 | E04H 6/42 |
| JP | 2020111896 A | * | 7/2020 | B60R 25/01 |

* cited by examiner

Step1: Vehicle and passenger arrive at boarding point.

Step2: Passenger opens trunk door and loads baggage into trunk room.

Step3: Boarding door opens, and passenger gets in passenger room.

SYSTEM AND METHOD FOR OPENING BOARDING DOOR

CROSS-REFERENCE TO RELATED APPLICATION

The present application claims priority under 35 U.S.C. § 119 to Japanese Patent Application No. 2021-114998, filed Jul. 12, 2021, the contents of which application are incorporated herein by reference in their entirety.

BACKGROUND

Field

The present disclosure relates to a system and method for opening a boarding door of a vehicle that provides use of a trunk room to a passenger, and a program for causing a computer to control the opening of the boarding door of the vehicle.

Background Art

JP2019-020985A discloses a prior art related to control of an unattended taxi. According to this prior art, a boarding door is unlocked upon detection of a passenger's approach, and a trunk door is unlocked if the passenger has reserved the use of a trunk room. Then, all the doors are locked when the passenger gets in the taxi.

As prior art documents representing the technical level of the technical field to which the present disclosure belongs, in addition to JP2019-020985A, JP2020-111896A can be exemplified.

SUMMARY

However, in the above-described prior art, while the passenger is loading a baggage into the trunk room, another person may get in the vehicle from the unlocked boarding door. Furthermore, in the case of a vehicle whose boarding door opens automatically when being unlocked like a Japanese taxi, there is also a possibility of problems such as the passenger room gets wet in rainy weather and the air conditioner efficiency becomes poor due to unnecessary contact with outside air. In addition, if the boarding door automatically opens when the passenger stands in front of the boarding door, the passenger may unintentionally get into the vehicle. This causes a trouble that the passenger fails to put his or her baggage into the vehicle. Furthermore, it is expected that the passenger will be confused about how to use the trunk room due to the automatic opening of the boarding door, which will delay the departure of the vehicle.

The present disclosure has been made in view of the above-described problems. An object of the present disclosure is to provide a technique capable of reducing the occurrence of trouble when a passenger loads a baggage into a trunk room and gets into a vehicle.

The present disclosure provides a system for opening a boarding door. The system of the present disclosure is a system applied to a vehicle that provides use of a trunk room to a passenger reserving the trunk room. The system of the present disclosure comprises at least one memory storing at least one program and at least one processor coupled to the at least one memory. The at least one program is configured to cause the at least one processor to: keep the boarding door closed until both a first condition and a second condition are satisfied; and open the boarding door or enable the boarding door to be opened in response to both the first condition and the second condition being satisfied. The first condition is that the passenger is in the vicinity of the boarding door. The second condition is that a trunk door is closed or that a reservation of the trunk room is cancelled.

According to the system of the present disclosure having the above-described configuration, the boarding door is not opened unless both the first condition and the second condition are satisfied. Therefore, the boarding door is prevented from opening or being openable before or while the passenger uses the trunk room.

In the system of the present disclosure, the at least one program may be configured to cause the at least one processor to confirm an intention of the passenger to cancel the reservation of the trunk room if the passenger is not detected in the vicinity of the trunk door after the vehicle arrives at the passenger. This makes it possible to urge the passenger who no longer needs to use the trunk room to cancel the reservation of the trunk room. If the reservation of the trunk room is cancelled, the boarding door will open if the passenger stands in the vicinity of the boarding door, allowing the passenger to get into the vehicle.

In the system of the present disclosure, the at least one program may be configured to cause the at least one processor to guide the passenger to the trunk door by voice or display if the passenger is not detected in the vicinity of the trunk door after the vehicle arrives at the passenger. Thus, the passenger who does not know the location of the trunk door can be guided thereto.

In the system of the present disclosure, the at least one program may be configured to cause the at least one processor to: automatically open the trunk door upon detecting that an opening/closing switch provided in the vehicle is pressed; and close the trunk door upon detecting that the opening/closing switch is pressed again.

According to the above-described processing, by detecting the operation of the opening/closing switch to open/close the trunk door, it is possible to prevent the trunk door from accidentally opening or closing regardless of the intention of the passenger.

In the system of the present disclosure, the at least one program may be configured to cause the at least one processor to: unlock the trunk door when authentication is performed between the vehicle and the passenger; and lock the trunk door upon closure of the trunk door.

According to the above processing, when the trunk door is closed, the trunk door is automatically locked, so that the safety of the baggage in the trunk room is ensured.

The present disclosure provides a method of opening a boarding door. The method of the present disclosure is a method applied to a vehicle that provides use of a trunk room to a passenger reserving the trunk room. The method of the present disclosure comprises: keeping the boarding door closed until both a first condition and a second condition are satisfied; and opening the boarding door or enabling the boarding door to be opened in response to both the first condition and the second condition being satisfied. The first condition is that the passenger is in the vicinity of the boarding door. The second condition is that the trunk door is closed or that a reservation of the trunk room is cancelled.

According to the method of the present disclosure comprising above-described steps, the boarding door is prevented from opening or being openable before or while the passenger uses the trunk room.

The present disclosure provides a program of opening a boarding door of a vehicle to be executed by a computer. The program of the present disclosure is a program applied to a vehicle that provides use of a trunk room to a passenger reserving the trunk room. The program of the present disclosure is configured to cause a computer to execute processing comprising: keeping the boarding door closed until both a first condition and a second condition are satisfied; and opening the boarding door or enabling the boarding door to be opened in response to both the first condition and the second condition being satisfied. The first condition is that the passenger is in the vicinity of the boarding door. The second condition is that the trunk door is closed or that a reservation of the trunk room is cancelled.

According to the program of the present disclosure configured as described above, the computer can control the opening/closing of the boarding door so that the boarding door is prevented from opening or being openable before or while the passenger uses the trunk room. The program according to the present disclosure may be recorded on a non-transitory computer-readable storage medium.

As described above, according to the technique of the present disclosure, it is possible to reduce the occurrence of trouble when the passenger loads a baggage into the trunk room and gets into the vehicle.

DETAILED DESCRIPTION

Hereunder, an embodiment of the present disclosure will be described with reference to the drawings. Note that when the numerals of numbers, quantities, amounts, ranges and the like of respective elements are mentioned in the embodiment shown as follows, the present disclosure is not limited to the mentioned numerals unless specially explicitly described otherwise, or unless the disclosure is explicitly designated by the numerals theoretically. Furthermore, structures and processes that are described in the embodiments shown as follows are not always indispensable to the disclosure unless specially explicitly shown otherwise, or unless the disclosure is explicitly designated by the structures or the processes theoretically.

1. Method of Opening and Closing Boarding Door

First, a method of opening a boarding door according to the embodiment of the present disclosure will be described. In the present embodiment, the method of opening a boarding door of the present disclosure is applied to a vehicle for MaaS. The vehicle may be a shared vehicle, such as a bus, or a dedicated vehicle, such as a taxi. The vehicle may also be an autonomously traveling vehicle, or a remotely operated vehicle that is remotely driven by a remote driver in a monitoring center. A passenger can use the vehicle by, for example, becoming a member of a mobility service using MaaS vehicles and making a reservation.

Figure 1:
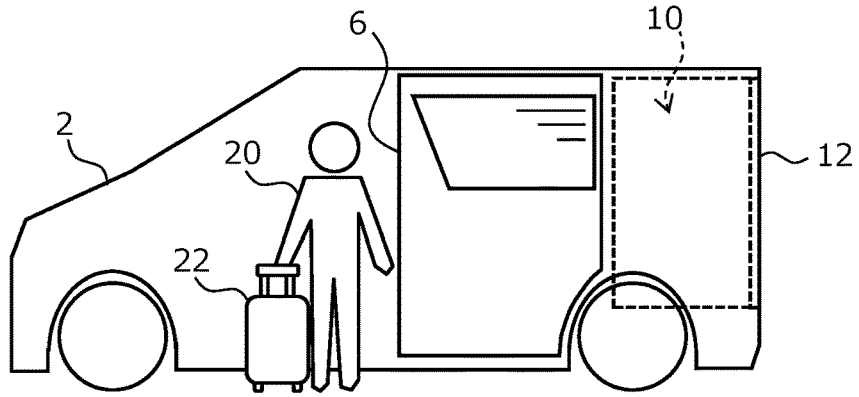
FIG. 1 is a schematic diagram for explaining a method of opening a boarding door according to an embodiment of the present disclosure.
Figure 1:
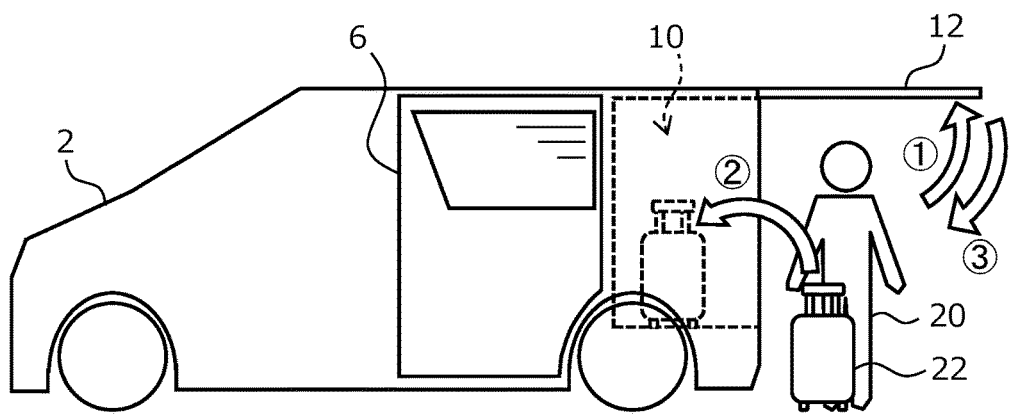
Figure 1:
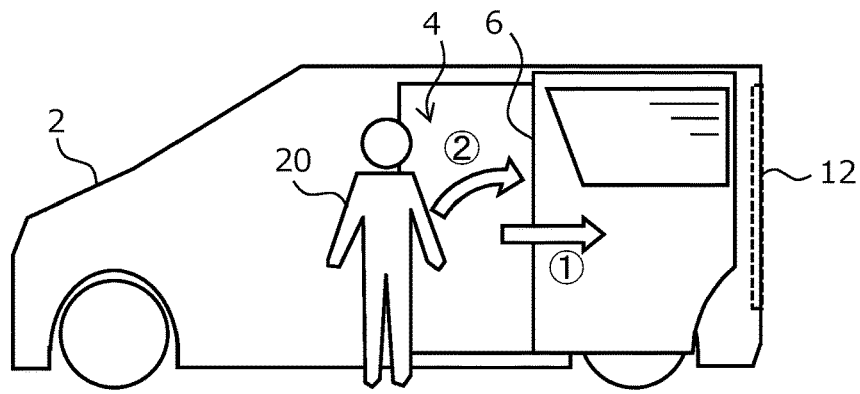

FIG. 1 is a schematic diagram for explaining the method of opening a boarding door according to the present embodiment (hereinafter, referred to as the method according to the present embodiment). The vehicle 2 to which the method according to the present embodiment is applied is a vehicle in which a trunk door 12 is provided separately from a boarding door 6, and a trunk room 10 is basically accessible only from the trunk door 12. As shown schematically in FIG. 1, the boarding door 6 is a sliding door provided on the side of the vehicle 2, and the trunk door 12 is a flip-up door provided on the rear of the vehicle 2.

The method according to the present embodiment is a method of opening the boarding door 6 when a passenger 20 having a baggage 22 gets in the vehicle 2. In FIG. 1, the operations from the arrival of the vehicle 2 and the passenger 20 at the boarding point until the passenger 20 gets into the vehicle 2 are represented by three steps.

In step 1 shown in FIG. 1, the vehicle 20 and the passenger 20 reserving the vehicle 2 arrive at the boarding point. An example of the boarding point is a predefined boarding location, such as a bus ride or taxi ride. The boarding point may be a place arbitrarily designated by the passenger 20 at the time of the reservation or may be a current position of the passenger 20.

The passenger 20 wishes to load the baggage 22 into the trunk room 10. The passenger 20 who desires to use the trunk room 10 is requested to reserve the trunk room 10 at the time of the reservation of the vehicle 2. When authentication is made between the vehicle 2 and the passenger 20, it is verified whether the passenger 20 is a passenger reserving the trunk room 10. If the passenger 20 is a passenger not reserving the trunk room 10, the vehicle 2 opens the boarding door 6 or enables the boarding door 6 to be opened upon completion of the authentication of the passenger 20. Here, enabling the boarding door 6 to be opened means making the boarding door 6 in an unlocked state while keeping a closed state.

If the passenger 20 is a passenger reserving the trunk room 10, the vehicle 2 does not open the boarding door 6, even if the passenger 20 comes close to the boarding door 6. In the case that the boarding door 6 is an automatic door that is automatically opened and closed by an actuator, not opening the boarding door 6 means that the actuator is not operated from the state in which the boarding door 6 is closed. In the case that the boarding door 6 is a manual door that is manually opened and closed by the passenger 20, not opening the boarding door 6 means that the boarding door 6 is not unlocked.

In step 2 shown in FIG. 1, the passenger 20 opens the trunk door 12 and loads the baggage 22 into the trunk room 10. Opening the trunk door 12 may be performed by the passenger 20 himself/herself or may be performed automatically by an actuator. After loading the baggage 22 into the trunk room 10, the passenger 20 closes the trunk door 12. Closing the trunk door 12 may be performed by the passenger 20 himself/herself or may be performed automatically by an actuator.

While the passenger 20 is loading the baggage 22 into the trunk room 10, the vehicle 2 maintains the boarding door 6 closed. If the boarding door 6 is an automatic door, the vehicle 2 maintains the boarding door 6 closed by not operating an actuator. If the boarding door 6 is a manual door, the vehicle 2 maintains the boarding door 6 closed by leaving the boarding door 6 locked.

In step 3 shown in FIG. 1, the boarding door 6 opens and the passenger 20 gets in the passenger room 4. The vehicle 2 opens the boarding door 6 or enables the boarding door 6 to be opened when the opened trunk door 12 is closed and the passenger 20 is in the vicinity of the boarding door 6. Conversely, even if the passenger 20 is in the vicinity of the boarding door 6, if the trunk door 12 remains open, the vehicle 2 maintains the boarding door 6 in a closed state. Further, even if the trunk door 12 is closed, if the passenger 20 is not in the vicinity of the boarding door 6, the vehicle 2 maintains the boarding door 6 in a closed state.

Since the opening and closing of the boarding door 6 is controlled as described above, when the boarding door 6 is an automatic door, the boarding door 6 is prevented from being opened until the passenger 20 has finished loading the baggage 22 into the trunk room 10 and comes close to the boarding door 6. Also, when the boarding door 6 is a manual door, the boarding door 6 is prevented from being unlocked until the passenger 20 has finished loading the baggage 22 into the trunk room 10 and comes close to the boarding door 6. Thus, it is possible to reduce the occurrence of trouble such as another person getting into the vehicle 2 accidentally while the passenger 20 is loading the baggage 22 into the trunk room 10.

Incidentally, the passenger 20 who reserved the trunk room 10 at the time of the reservation of the vehicle 2 may reconsider that it is not required to use the trunk room 10 when the vehicle 2 arrives. For example, if the baggage 22 can be carried into the passenger room 4, the passenger 20 may consider that it is needless to use the trunk room 10. In such a case, the passenger 20 is permitted to cancel the reservation of the trunk room 10. When the passenger 20 cancels the reservation of the trunk room 10, the vehicle 2 opens the boarding door 6 or enables the boarding door 6 to be opened if the passenger 20 is in the vicinity of the boarding door 6.

The method according to the present embodiment as described above has two conditions with respect to the opening of the boarding door 6. The first condition is that the passenger 20 is in the vicinity of the boarding door 6. The second condition is that the opened trunk door 12 is closed or the reservation of the trunk room 10 is cancelled. The method according to the present embodiment includes keeping the boarding door 6 closed until both the first condition and the second condition are satisfied and opening the boarding door 6 or enabling the boarding door 6 to be opened in response to both the first condition and the second condition being satisfied.

2. System for Opening and Closing Boarding Door

The method according to the present embodiment described above is implemented by the system according to the embodiment of the present disclosure (hereinafter, referred to as the system according to the present embodiment). The system according to the present embodiment will be described below.

Figure 2A:
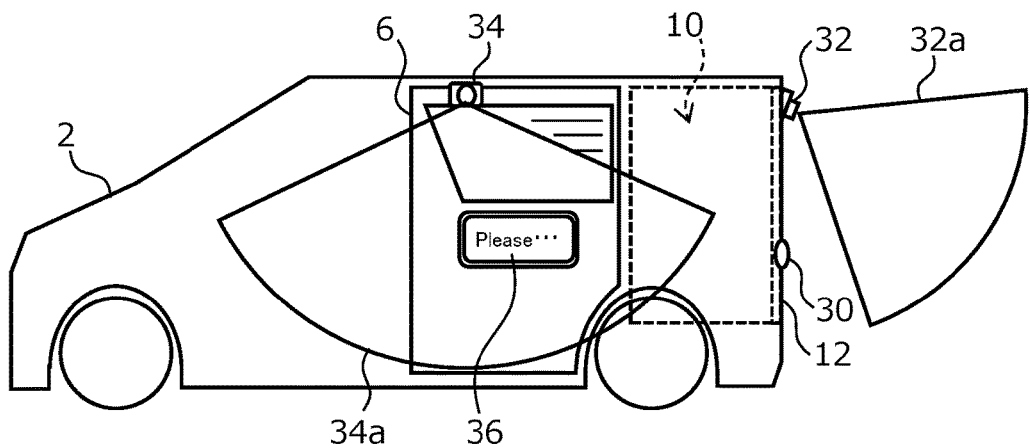
FIGS. 2A and 2B are schematic diagrams showing a configuration of a vehicle to which a system for opening a boarding door according to the embodiment of the present disclosure is applied.
Figure 2B:
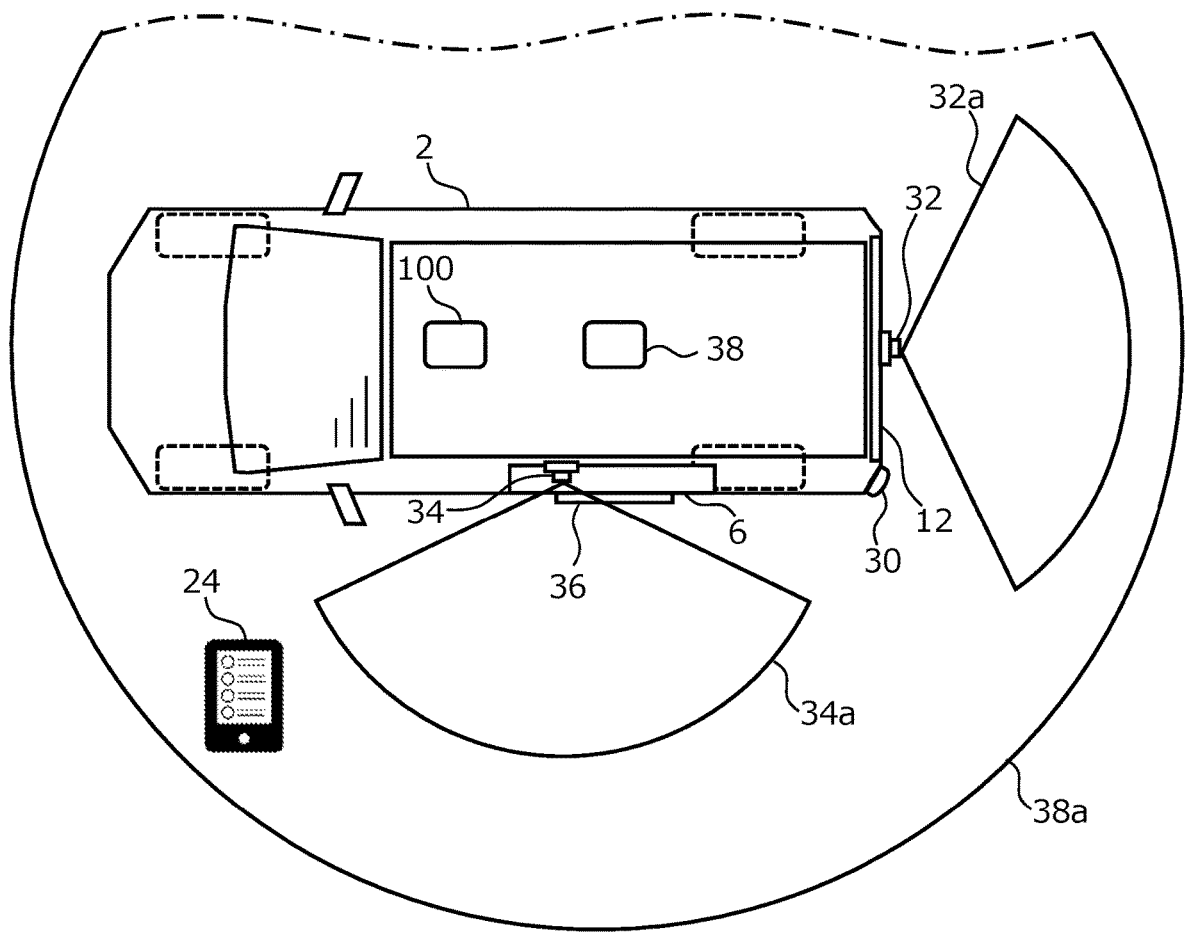

FIGS. 2A and 2B are schematic diagrams showing the configuration of the vehicle 2 to which the system according to the present embodiment is applied. FIG. 2A is a side view of the vehicle 2. FIG. 2B is a plan view of the vehicle 2. As shown in FIGS. 2A and 2B, the vehicle 2 includes a boarding door front camera 34 provided on the boarding door 6 and a trunk door front camera 32 provided on the trunk door 12. Further, the vehicle 2 includes a trunk door opening/closing switch 30 provided on the rear of the vehicle 2, and a guide device 36 attached to the boarding door 6.

The boarding door front camera 34 is mounted so that the vicinity of the boarding door 6 is within a photographing range 34a thereof. If the passenger 20 is in the vicinity of the boarding door 6, the passenger 20 is sensed by the boarding door front camera 34. The trunk door front camera 32 is mounted so that the vicinity of the trunk door 12 is within a photographing range 32a thereof. If the passenger 20 is in the vicinity of the trunk door 12, the passenger 20 is sensed by the trunk door front camera 32. The photographing range 32a of the trunk door front camera 32 may or may not overlap the photographing range 34a of the boarding door front camera 34.

The trunk door opening/closing switch 30 is a switch used for opening and closing the trunk door 12. In the following description, it is assumed that the trunk door 12 is an automatic door that is automatically opened and closed by an actuator. The actuator for opening and closing the trunk door 12 may be an electric type, or may be a hydraulic type, or may be a vacuum type. When the passenger 20 pushes the trunk door opening/closing switch 30 in a state where the trunk door 12 is closed, the trunk door 12 is automatically opened by the actuator. When the passenger 20 pushes the trunk door opening/closing switch 30 in a state where the trunk door 12 is open, the trunk door 12 is automatically closed by the actuator. By opening and closing the trunk door 12 upon detection of the operation of the trunk door opening/closing switch 30, the trunk door 12 is prevented from being mistakenly opened and from being mistakenly closed regardless of the intention of the passenger 20. Incidentally, the trunk door opening/closing switch 30 may be a button switch that is pressed by a finger of the passenger 20, or a foot sensor that reacts to a foot placed by the passenger 20.

The guide device 36 includes a display for providing character guidance to the passenger 20, and a speaker for providing voice guidance to the passenger 20. The speaker outputs audio information with the same content as the text information displayed on the display. The guide device 36 outputs text information and audio information for guiding a series of operations until the passenger 20 loads the baggage 22 into the trunk room 10 and gets into the passenger room 4. Incidentally, the specific contents of the guide by the guide device 36 will be described later.

Further, as shown in FIG. 2B, the vehicle 2 includes an authentication unit 38 and a control unit 100. The authentication unit 38 is used for the authentication of the passenger 20. The passenger 20 reserving the vehicle 2 receives an encryption key from a server using mobile communication by a mobile terminal 24 such as a smartphone. When the mobile terminal 24 which has received the encryption key enters an authentication area 38a within a certain distance from the vehicle 2, the passenger 20 is automatically authenticated by short-range wireless communication with the authentication unit 38 and becomes able to get in the vehicle 2.

Figure 3:
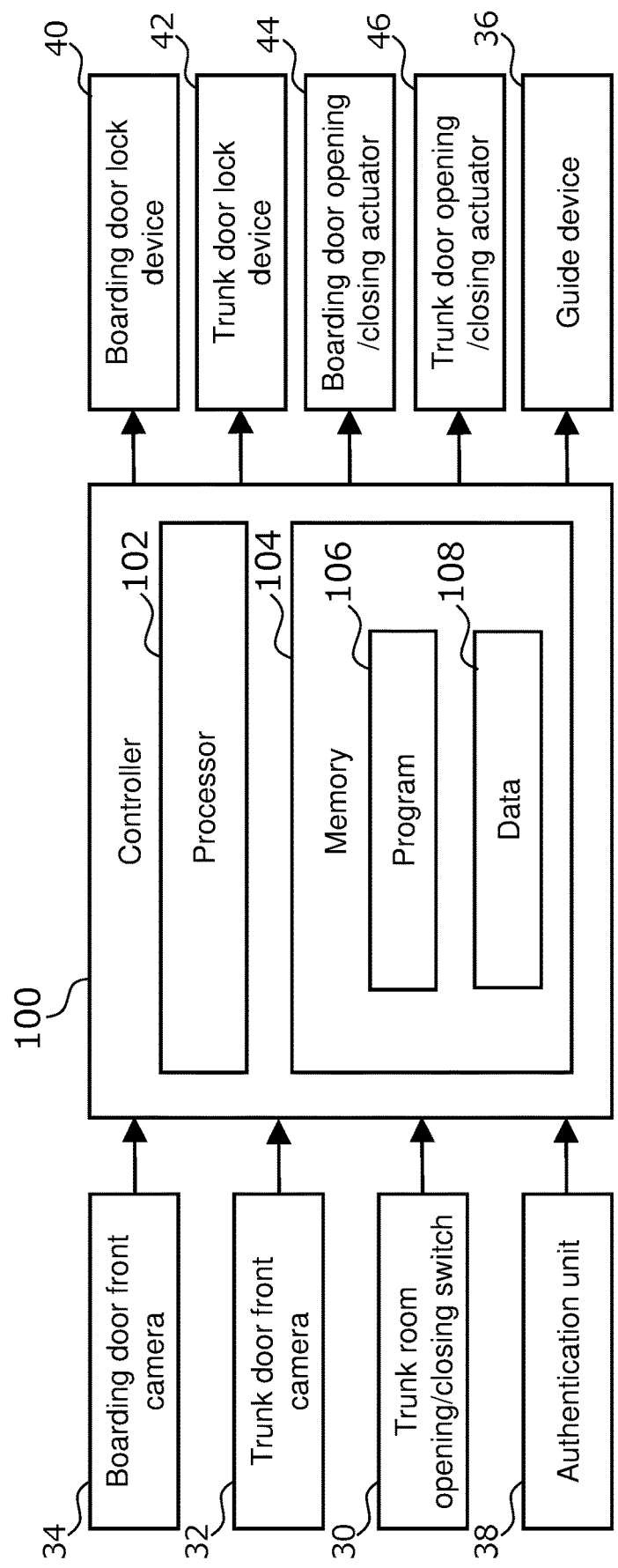
FIG. 3 is a block diagram illustrating a configuration of the system for opening a boarding door according to an embodiment of the present disclosure.

The controller 100 is a core device of the system according to the present embodiment. Here, FIG. 3 is a block diagram showing the configuration of the system according to the present embodiment. The control unit 100 receives signals from the boarding door front camera 34, the trunk door front camera 32, the trunk door opening/closing switch 30, and the authentication unit 38. From the controller 100, signals are output to a boarding door lock device 40, a trunk door lock device 42, a boarding door opening/closing actuator 44, a trunk door opening/closing actuator 46, and the guide device 36.

The boarding door lock device 40 is a device for performing unlocking and locking the boarding door 6. The trunk door lock device 42 is a device for performing unlocking and locking the trunk door 12. The boarding door opening/closing actuator 44 is an actuator for automatically opening and closing the boarding door 6. In the following description, it is assumed that the boarding door 6 is an automatic door that is automatically opened and closed by an actuator. The boarding door opening/closing actuator 44 may be an electric type, may be a hydraulic type, or may be a vacuum type. The trunk door opening/closing actuator 46 is an actuator for automatically opening and closing the trunk door 12.

The controller 100 is a computer having at least one processor 102 (hereinafter simply referred to as a processor 102) and at least one memory 104 (hereinafter simply referred to as a memory 104) coupled to the processor 102. The memory 104 stores at least one program 106 (hereinafter simply referred to as a program 106) executable by the processor 102 and various associated data 108. The memory 104 includes a main storage device and an auxiliary storage device. The program 106 and the data 108 may be stored in a main storage device or in a computer-readable recording medium that is an auxiliary storage device.

3. Program for Opening and Closing Boarding Door

The program according to the embodiment of the present disclosure (hereinafter, referred to as the program according to the present embodiment) is one of the programs 106 stored in the memory 104. The program according to the present embodiment is executed by the processor 102 to cause the controller 100 to function as the system for opening the boarding door. The program according to the present embodiment will be described below.

Figure 4:
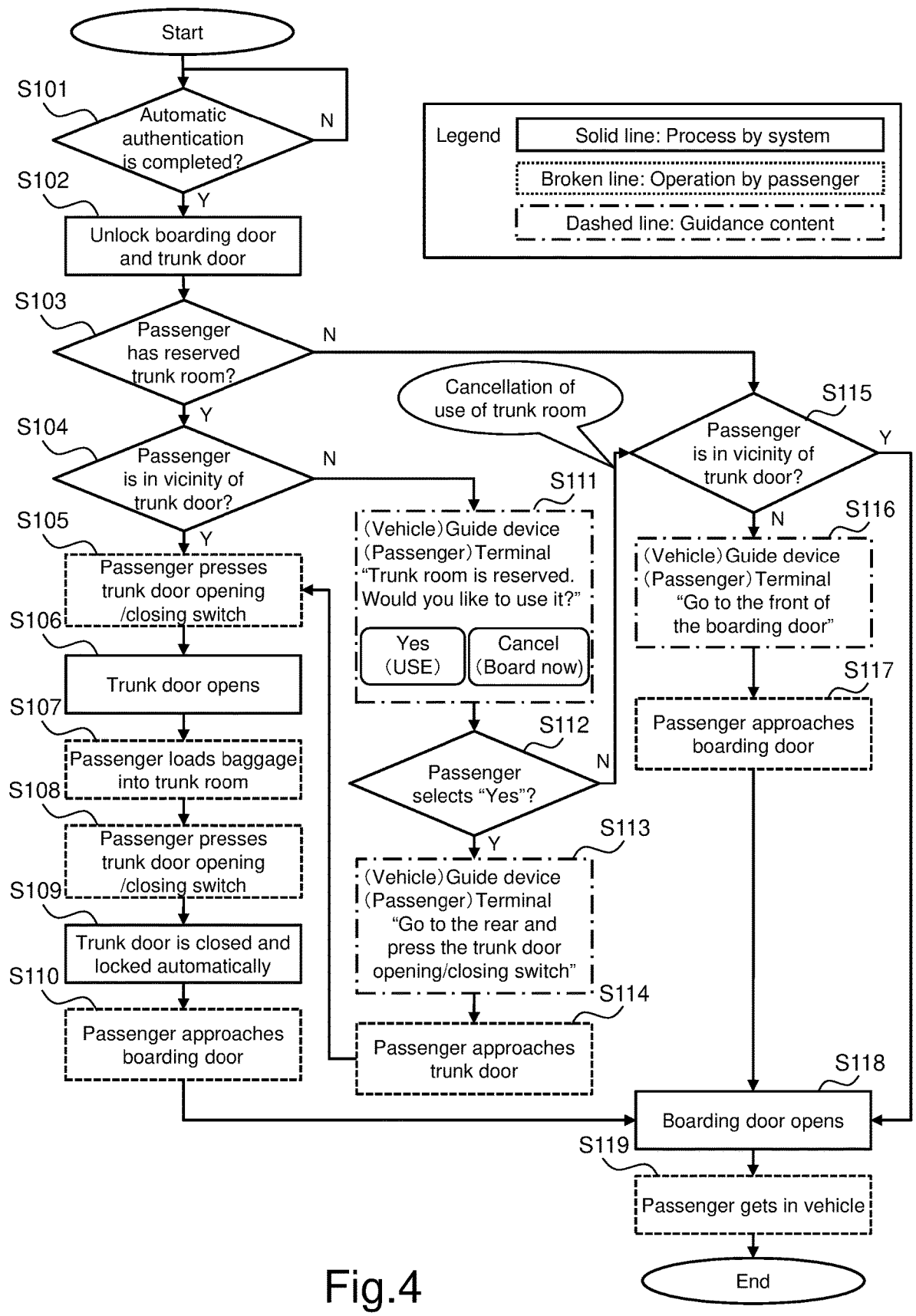
FIG. 4 is a flowchart illustrating a program for opening a boarding door according to an embodiment of the present disclosure.

FIG. 4 is a flowchart for explaining the program according to the present embodiment. In this flowchart, solid line frames show processes by the controller 100 as the system according to the present embodiment, broken line frames show operations by the passenger 20, and dashed line frames show contents of guidance by the guide device 36.

First, the controller 100 determines completion of the automatic authentication between the passenger 20 and the vehicle 2 (step S101). An encryption key is transmitted from the authentication server to the mobile terminal 24 of the passenger 20 reserving the vehicle 2. When the passenger 20 enters the authentication area 38a with the mobile terminal 24, the passenger 20 is automatically authenticated by the authentication unit 38. Upon the completion of the automated authentication, the controller 100 unlocks the boarding door 6 and the trunk door 12 by actuating the boarding door lock device 40 and the trunk door lock device 42, respectively (step S102).

Next, the controller 100 determines whether the passenger 20 is a passenger reserving the trunk room 10 (step S103). Whether the passenger 20 has reserved the trunk room 10 may be determined, for example, by querying a server. Further, the encryption key transmitted from the server to the mobile terminal 24 of the passenger 20 may be changed depending on the presence or absence of the reservation of the trunk room 10 to determine whether or not the passenger 20 has reserved the trunk room 10.

If the passenger 20 has reserved the trunk room 10, the controller 100 determines whether the passenger 20 is in the vicinity of the trunk door 12 (step S104). Whether or not the passenger 20 is in the vicinity of the trunk door 12 is determined by whether or not the passenger 20 is caught by the trunk door front camera 32. Alternatively, by measuring the distance and direction of the mobile terminal 24 from the vehicle 2 using the short-range wireless communication, it may be determined whether the passenger 20 having the mobile terminal 24 is in the vicinity of the trunk door 12.

If the passenger 20 is in the vicinity of the trunk door 12, the controller 100 waits for an input of a signal from the trunk door opening/closing switch 30. The passenger 20 wishing to load the baggage 22 into trunk room 10 presses the trunk door opening/closing switch 30 to open the trunk door 12 (step S105). Upon receiving the input of the signal from the trunk door opening/closing switch 30, the controller 100 opens the trunk door 12 by actuating the trunk door opening/closing actuator 46 (step S106).

The passenger 20 loads baggage 22 into the trunk room 10 that has become accessible because the trunk door 12 has become open (step S107). When loading of the baggage 22 into the trunk room 10 is completed, the passenger 20 presses the trunk door opening/closing switch 30 again to close the trunk door 12 (step S108). Upon receiving the input of the signal from the trunk door opening/closing switch 30, the controller 100 closes the trunk door 12 by actuating the trunk door opening/closing actuator 46, further, locks the trunk door 12 by actuating the trunk door lock device 42 (step S109). When the trunk door 12 is closed, the trunk door 12 is automatically locked, so that the safety of the baggage 22 in the trunk room 10 is ensured.

The passenger 20, after loading the baggage 22, approaches the boarding door 6 for getting in the vehicle (step S110). The controller 100 determines that the passenger 20 has approached the boarding door 6 when the passenger 20 is caught by the boarding door front camera 34. Alternatively, by measuring the distance and direction of the mobile terminal 24 from the vehicle 2 using the short-range wireless communication, it may be determined whether the passenger 20 having the mobile terminal 24 has approached the boarding door 6.

Upon confirming that the passenger 20 has approached the boarding door 6, the controller 100 actuates the boarding door opening/closing actuator 44 to open the boarding door 6 (step S118). After the completion of the automated authentication, the boarding door 6 opens for the first time at this time. The passenger 20 is allowed to get into the passenger room 4 from the open boarding door 6 (step S119).

If the passenger 20 is not in the vicinity of trunk door 12 even though the passenger 20 reserves trunk room 10, the determination of the step S104 is negative. In this case, the controller 100 performs guidance by the guide device 36 (step S111). The guide device 36 displays a message "Trunk room is reserved. Would you like to use it?" on the display and plays sound of the same content as the message through the speaker. At the same time, the control unit 100 causes the mobile terminal 24 to display a guide of the same content as the message and display two options of "Yes (Use)" and "Cancel (Board now)". The controller 100 may perform displaying the guidance and the options on the mobile terminal 24 directly by the short-range wireless communication or indirectly by the mobile communication via a server.

The controller 100 waits for a choice of whether to use the trunk room 10 by the passenger 20 (step S112). If it is detected that the passenger 20 has selected "Yes", the controller 100 performs the guidance by the guide device 36 (step S113). The guide device 36 displays a message "Go to the rear and press the trunk door opening/closing switch." on the display and plays sound of the same content as the message through the speaker. At the same time, the control unit 100 causes the mobile terminal 24 to display a guide of the same content as the message.

Guided by the guide device 36 and the mobile terminal 24, the passenger 20 approaches the trunk door 12 (step S114). The passenger 20 wishing to load the baggage 22 into the trunk room 10 presses the trunk door opening/closing switch 30 to open the trunk door 12 (step S105). The subsequent processes by the controller 100 and the subsequent operations by the passenger 20 are as described above. Through the step S106, S107, S108, S109, S110, and S118, the passenger 20 is allowed to get into the passenger room 4 from the open boarding door 6 (step S119).

On the other hand, if it is detected in the step S112 that the passenger 20 has selected "Cancel", the controller 100 determines that the passenger 20 is willing to cancel the reservation of the trunk room 10. After the cancellation of the reservation, the controller 100 determines whether the passenger 20 is in the vicinity of the boarding door 6 (step S115). Whether or not the passenger 20 is in the vicinity of the boarding door 6 is determined by whether or not the passenger 20 is caught by the boarding door front camera 34. Alternatively, by measuring the distance and direction of the mobile terminal 24 from the vehicle 2 using the short-range wireless communication, it may be determined whether the passenger 20 having the mobile terminal 24 is in the vicinity of the boarding door 6.

If the passenger 20 is in the vicinity of the boarding door 6, the controller 100 actuates the boarding door opening/closing actuator 44 to open the boarding door 6 (step S118). The passenger 20 is allowed to get into the passenger room 4 from the open boarding door 6 (step S119).

If the passenger 20 is not in the vicinity of the boarding door 6, the controller 100 provides guidance by the guide device 36 (step S116). The guide device 36 displays a message "Go to the front of the boarding door." on the display and plays sound of the same content as the message through the speaker. At the same time, the controller 100 displays a guide of the same content on the mobile terminal 24.

Guided by the guide device 36 and the mobile terminal 24, the passenger 20 approaches the boarding door 6 (step S117). Upon confirming that the passenger 20 has approached the boarding door 6, the controller 100 actuates the boarding door opening/closing actuator 44 to open the boarding door 6 (step S118). The passenger 20 is allowed to get into the passenger room 4 from the open boarding door 6 (step S119).

The processes by the controller 100 and the operations by the passenger 20 described above are processes and operations when the passenger 20 has reserved the trunk room 10. If the passenger 20 has not reserved the trunk room 10 from the beginning, the determination of the step S103 is negative. In this case, the controller 100 determines whether the passenger 20 is in the vicinity of the boarding door 6 (step S115). If the passenger 20 is in the vicinity of the boarding door 6, the controller 100 opens the boarding door 6 (step S118). If the passenger 20 is not in the vicinity of the boarding door 6, the controller 100 guides the passenger 20 to the boarding door 6 by the guide device 36 and the mobile terminal 24 (step S116). Then, in response to the passenger 20 approaching the boarding door 6 (step S117), the controller 100 opens the boarding door 6 (step S118). The passenger 20 is allowed to get into the passenger room 4 from the open boarding door 6 (step S119).

4. Other Embodiments

In the above-described embodiment, the processes of opening the boarding door 6 are performed by the controller 100 of the vehicle. Alternatively, the determination relating to the opening of the boarding door 6 may be performed by the server, and the control of the actuator based on the determination may be performed by the controller 100.

What is claimed is:

1. A system for opening a boarding door of a vehicle that provides use of a trunk room to a passenger reserving the trunk room, the system comprising:
   at least one memory storing at least one program, and
   at least one processor coupled to the at least one memory,
   wherein the at least one program is configured to cause the at least one processor to:
      keep the boarding door closed until both a first condition and a second condition are satisfied; and
      open the boarding door or enable the boarding door to be opened in response to both the first condition and the second condition being satisfied,
   wherein the first condition is that the passenger is in the vicinity of the boarding door, and the second condition is that a trunk door is closed and locked such that the trunk door cannot open or that a reservation of the trunk room is cancelled, and
   wherein the boarding door and the trunk door are spaced from each other, the boarding door is on a side of the vehicle and the trunk door is at a rear of the vehicle.

2. The system according to claim 1, wherein the at least one program is configured to cause the at least one processor to confirm an intention of the passenger to cancel the reservation of the trunk room if the passenger is not detected in the vicinity of the trunk door after the vehicle arrives at the passenger.

3. The system according to claim 1, wherein the at least one program is configured to cause the at least one processor to guide the passenger to the trunk door by voice or display if the passenger is not detected in the vicinity of the trunk door after the vehicle arrives at the passenger.

4. The system according to claim 1, wherein the at least one program is configured to cause the at least one processor to:
   automatically open the trunk door upon detecting that an opening/closing switch provided in the vehicle is pressed; and
   close the trunk door upon detecting that the opening/closing switch is pressed again.

5. The system according to claim 1, wherein the at least one program is configured to cause the at least one processor to:
   unlock the trunk door when authentication is performed between the vehicle and the passenger; and
   lock the trunk door upon closure of the trunk door.

6. A method of opening a boarding door of a vehicle that provides use of a trunk room to a passenger reserving the trunk room, the method comprising:
   keeping the boarding door closed until both a first condition and a second condition are satisfied; and
   opening the boarding door or enabling the boarding door to be opened in response to both the first condition and the second condition being satisfied,
   wherein the first condition is that the passenger is in the vicinity of the boarding door and the second condition is that a trunk door is closed and locked such that the trunk door cannot open or that a reservation of the trunk room is cancelled, and
   wherein the boarding door and the trunk door are spaced from each other, the boarding door is on a side of the vehicle and the trunk door is at a rear of the vehicle.

7. A non-transitory computer-readable storage medium storing a program of opening a boarding door of a vehicle that provides use of a trunk room to a passenger reserving the trunk room, the program being configured to cause a computer to execute processing comprising:
    keeping the boarding door closed until both a first condition and a second condition are satisfied; and
    opening the boarding door or enabling the boarding door to be opened in response to both the first condition and the second condition being satisfied,
    wherein the first condition is that the passenger is in the vicinity of the boarding door and the second condition is that a trunk door is closed and locked such that the trunk door cannot open or that a reservation of the trunk room is cancelled, and
    wherein the boarding door and the trunk door are spaced from each other, the boarding door is on a side of the vehicle and the trunk door is at a rear of the vehicle.

\* \* \* \* \*